United States Patent Office 3,549,479
Patented Dec. 22, 1970

3,549,479
PLASTICIZED PHENOLIC RESIN IMPREGNATION SYSTEM COMPRISING TWO DIFFERENT PHENOLIC RESOLE RESINS AND A HALO ARYL PHOSPHATE
Ronald H. Dahms, Springfield, Mass., assignor to Monsanto Company, St. Louis, Mo., a corporation of Delaware
No Drawing. Filed June 21, 1968, Ser. No. 738,783
Int. Cl. B23b 27/22; C08f 45/50; C08g 5/06
U.S. Cl. 161—191
5 Claims

ABSTRACT OF THE DISCLOSURE

Compositions of two different phenolic resole resins and a compatible halo aryl phosphate. The compositions are storage stable and can be used for the single pass impregnation of cellulosic sheets which are in turn useable in the manufacture of laminates having fire retardancy, low temperature punchability, low water absorption and good electrical characteristics.

BACKGROUND

In the art of making laminates using phenolic resins and cellulosic substrates, there has been a long felt need for good electrical properties combined with fire retardancy and crack-free punchability. Pure thermoset phenolic resins particularly in combination with cellulosic substrates not only have a tendency to combust at elevated temperatures, but also have relatively mediocre electrical properties. In addition, they characteristically display a capacity to be punched only at elevated temperatures (e.g., temperatures above about 100° C.) without cracking.

Heretofore, in an effort to combat these deficiencies, the art has attempted to compound plasticizers with liquid phenolic resins before such are impregnated into cellulosic substrates in laminate manufacture. Such combinations, though they have sometimes worked to a degree to accomplish the other desired objectives, have not imparted any particular fire retardancy to the resulting laminates. It has been a very difficult problem to compound liquid phenolic resins with compatible plasticizers which will not only characteristically maintain electrical properties and improve punchability in the product laminates, but which will also improve fire retardancy therein, and at the same time not adversely affect other desired properties in a product laminate. The problem of compounding is further complicated by the fact that the art desires to impregnate preformed cellulosic sheets in a single pass operation so that it is necessary to have all components in a single resin treating formulation, making compatibility of components essential.

There has now been discovered a class of liquid phenolic resin formulations suitable for a single pass impregnation of cellulosic preformed substrate members which contains a combination of two different resole resin components and a member of a class of certain fire retardant plasticizers. When this formulation is used for the manufacture of laminates incorporating cellulosic substrates, there are produced product laminates having a surprising combination of good electrical properties, high fire retardancy and relatively low temperature punchability.

SUMMARY

This invention is directed to new and useful solutions of plasticizers and resole resins, to intermediate cellulosic preformed substrate sheet members impregnated therewith, and to thermoset laminates made from such impregnated sheet members.

The solutions of plasticizers and resole resins of this invention are surprising not only because the particular plasticizers employed are compatible with the particular resole resins employed in the respective amounts of each used (i.e., the one type of component does not interact chemically or physically with the other), but also because the resulting solutions are storage stable for prolonged periods of time. The thermoset laminates of this invention are surprising because of their combination of good electrical properties (low dielectric constants and low dissipation factors), good fire retardancy, low water absorption, and relatively low crack free punch temperatures compared to, for example, these same resole resins used without this plasticizer.

The solutions of this invention comprise:

(A) from about 5 to 20 weight percent (total resin solids basis) of water-soluble phenol-formaldehyde resole resin having a combined phenol to formaldehyde mol ratio of from about 1.0 to 2.5,
(B) from about 50 to 75 weight percent (total resin solids basis) of a substituted phenol-formaldehyde resole resin,
(C) from about 15 to 35 weight percent (total solids basis) of at least one organo phosphate of the formula:

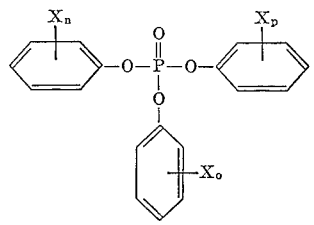

where, each individual X is selected from the group consisting of fluorine, chlorine, bromine, and iodine, and $n$, $o$, and $p$ are each an integer of from 0 through 5 inclusive, and at least one of $n$, $o$ and $p$ in any given molecule is an integer greater than 0, and
(D) the balance up to 100 weight percent (total solids basis) of any given solution being an organic liquid which:
  (1) is substantially inert (as respects solution components),
  (2) evaporates below about 150° C. at atmospheric pressures, and
  (3) is a mutual solvent for said resins and said organo phosphate.

Optionally, up to about 15 weight percent water can be present in dissolved form in said organic liquid. The intermediate (non-thermoset) cellulosic preformed substrate sheet members of this invention are impregnated with from about 5 to 70 weight percent (based on total sheet member weight) of solids derived from a solution of this invention.

The laminates made from these intermediate sheet members employ a plurality of such members arranged face to face in a layered configuration and thermoset together under heat and pressure to form an integral article of manufacture.

The water-soluble phenol-formaldehyde resole resin used in the phenolic resin solutions of this invention is produced by reacting under aqueous liquid phase conditions phenol with formaldehyde in the presence of a basic catalyst (preferably organic). It has a low molecular weight as demonstrated by the fact that this resin is water soluble. Thus, a 55 weight percent aqueous solution thereof can be prepared. This solution characteristically has a water dilutability of at least about 1:1, and preferably of at least about 8:1. In addition, this resin has a free formaldehyde content which is less than about 5 weight percent. Preferably, the combined phenol to formaldehyde mol ratio in this resin ranges from about 1 to 2.5. An organic basic catalyst is preferably used in preparation as indicated so as to produce a resole resin product which will not contain free ions which might conduct an electrical charge after the resin has been thermoset. Suitable organic basic catalysts are well known to the art; examples include triethylamine, hexamethylenetetramine, and the like. The preparation of such resins is well known to those of ordinary skill in the art.

The substituted phenol-formaldehyde resole resin employed in this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

It will be appreciated that the aldehyde to phenol ratios herein described have reference to the total amount of phenol present before a reaction including the phenol which is substituted.

The substituted phenol mixture used to make such resin is itself prepared by reacting phenol under Friedel-Crafts conditions with a controlled mixture of carbocyclic compounds. The mixture of carbocyclic compounds comprises (on a 100 weight percent basis when in a form substantially free of other materials):

(A) from about 10 through 40 weight percent of compounds each molecule of which has:
  (1) the indene nucleus,
  (2) from 9 through 13 carbon atoms,
  (3) as nuclear substituents from 0 through 4 methyl groups,
(B) from about 5 through 70 weight percent of compounds each molecule of which has:
  (1) the dicyclopentadiene nucleus,
  (2) from about 10 through 13 carbon atoms,
  (3) as nuclear substituents from 0 through 3 methyl groups,
(C) from about 15 through 65 weight percent of compounds each molecule of which has:
  (1) a phenyl group substituted by a vinylidene group,
  (2) from about 8 through 13 carbon atoms,
  (3) as substituents from 0 through 3 groups selected from the class consisting of methyl and ethyl,
(D) from about 0 through 5 weight percent divinyl benzene,
(E) provided that the sum total of all such compounds in any given such mixture of carboxylic compounds is always 100 weight percent.

At the time when such controlled mixture of carbocyclic compounds is reacted with phenol as indicated, there can be present in such mixture as diluents inert (i.e., as respects reactivity towards phenol under Friedel-Crafts reaction conditions) organic compounds such as aromatic and aliphatic hydrocarbons. Thus, there is present, conveniently at least about 25 weight percent of diluent in such total combination of mixture of carbocyclic compounds and diluent, although this value is variable depending upon reactants and reaction conditions. While there is no apparent upper limit on the amount of diluent which may be present, it is preferred that the amount of diluent present be not greater than about 95 weight percent (same basis). Preferably, the amount of diluent ranges from about 15 to 70 weight percent (same basis). Up to about 10 weight percent (same basis) of water can be present, but it is preferred to use substantially anhydrous conditions.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD." Another suitable such mixture is available from Monsanto Company, St. Louis, Mo., under the trade designation "Resin Oil." Still another such mixture is available from the Gulf Oil Company under the trade designation "Resin Former Feed Stock." A presently preferred such mixture is the Monsanto Company "Resin Oil" which is a $C_8$ to $C_{13}$ product cut with a boiling range of from about 300 to 425° F. (150 to about 220° C.) and contains the indicated carbocyclic compound mixture. Shown below in Table I is a breakdown such as is made by vapor-phase chromatography showing the composition of these three carbocyclic compound mixtures.

TABLE I

| | Gulf Oil [2] | Monsanto [3] | Enjay [4] |
|---|---|---|---|
| Vinylidene aromatics: | | | |
| Styrene $C_8$ | 7.6 | 1.4 | 10.1 |
| Alpha-methylstyrene $C_9$ | 1.6 | 2.8 | 2.2 |
| Beta-methylstyrene $C_9$ | 1.5 | 1.6 | 2.1 |
| Vinyltoluene $C_9$ | 4.5 | 17.4 | 10.5 |
| $C_2$ Alkylstyrene [1] $C_{10}$ | 0.9 | 6.2 | 5.8 |
| Divinylbenzene $C_{10}$ | 0.3 | 1.3 | 1.6 |
| Indenes: | | | |
| Indene $C_9$ | 12.7 | 17.6 | 12.7 |
| Methylindene $C_{10}$ | 0.3 | 5.5 | 7.6 |
| Cyclopentadienes: | | | |
| Isoprene-cyclopentadiene $C_{10}$ | 0.6 | 0.3 | |
| Dicyclopentadiene $C_{10}$ | 42.7 | 13.9 | 1.1 |
| Methylcyclopentadiene $C_{11}$ | 12.4 | 4.6 | 2.1 |
| Alkyl aromatics: | | | |
| Benzene $C_6$ | 0.5 | | 0.1 |
| Toluene $C_7$ | 3.9 | | 0.8 |
| $C_2$ Alkylbenzene $C_8$ | 7.4 | 0.4 | 12.1 |
| $C_3$ Alkylbenzene $C_9$ | 1.2 | 19.2 | 22.2 |
| $C_4$ Alkylbenzene $C_{10}$ | | 4.1 | 6.3 |
| Naphthalenes, Naphthalene $C_{14}$ | 0.2 | 3.2 | 2.2 |
| Unidentified (aliphatics) | 2.1 | | |
| Total carbocyclic compound mixture content | 84.8 | 72.6 | 55.9 |
| ASTM Boil Range, °F. (ASTM D-86): | | | |
| Initial boiling point | 283 | 315 | 307 |
| 10% | 318 | 333 | 320 |
| 50% | 329 | 343 | 342 |
| 90% | 348 | 367 | 401 |
| End Point | 364 | 402 | 411 |
| Residue | 1.0 | | |
| Specific Gravity | 0.952 | 0.933 | 0.900 |

[1] This styrene compound is selected from the group consisting of ethylstyrene and dimethylstyrene.
[2] Available commercially from the Gulf Oil Co. as "Resin Former Feed Stock."
[3] Available commercially from the Monsanto Company under the trade designation "Resin Oil."
[4] Available commercially from Enjay Company under the trade designation "Heart Cut LPD."

By the term "dicyclopentadiene" reference is had to a molecule having the structure.

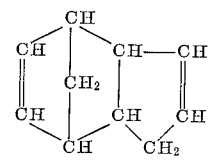

By the phrase "when in a form substantially free of other materials" reference is had to a mixture (e.g., of starting materials, of products, or the like, as the case may be) which is substantially free (e.g., on an analytical or a theoretical basis) of substances (like inerts) other than such mixture itself. For example, in Table I above, the carbocyclic compound mixtures are composed of indenes, vinylidene aromatics, and dicyclopentadienes as well as inert diluents, such as "alkyl aromatics," "naphthalenes" and "unidentified aliphatics," but each contains a combination (on a 100 weight percent basis in a form substantially free of other materials) of components (indenes, dicyclopentadiene, and vinylidene aromatics) as described above.

In this invention, all solids are conveniently measured using the ASTM Test Procedure D115-55.

Also in such a preferred embodiment, the substituted phenol used in making phenolic resin is made using a carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group as above described, the percentage of divinyl benzene in such preferred carbocyclic compound mixture being as described above. In any such more preferred carbocyclic compound mixture, there are a total of 100 weight percent of these three components.

The term "vinylidene" as used herein has generic reference both to vinylidene radicals ($CH_2=C<$), and vinyl radicals $CH_2=CH—$ or $—CH=CH—$); observe that in carbocyclic compound mixtures used in this invention having a phenyl group substituted by a vinylidene group, alpha-methyl substitution is included in this definition, as well as styrene, methyl styrene, and ethyl styrene.

To react phenol with such an afore-described carbocyclic compound mixture, it is convenient to use Friedel-Crafts conditions, as indicated.

Friedel-Crafts catalysts which may be used in place of aluminum chloride, or together with aluminum chloride, include:

(A) other inorganic hailides, such as gallium, titanium, antimony and zinc halides (including $ZnCl_2$);
(B) inorganic acids such as sulphuric, phosphoric and the hydrogen halides (including H F);
(C) activated clays, such as silica gel and alumina;
(D) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid and the like, or with organic acids, such as phosphoric acid, sulfuric acid, and the like, and
(E) alkyl, aryl and aralkyl sulfonic acids, such as ethanesulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, $\beta$-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol and catalyst can be used, it is particularly convenient to react in the presence of less than about 10 weight percent (based on the phenol) of acid catalyst.

The reaction mass is heated to a temperature in the range of from about 25 to 200° C. The rate of this reaction is dependent, to some degree, on the temperature employed. In general, the reaction is rapid, and a complete reaction between phenol and carbocyclic compound mixture is preferred. Generally, a heating time of from about 10 minutes to 4 hours is employed. The various process variables are summarized in Table II below.

TABLE II

| Process variable | Broad range | Preferred range |
| --- | --- | --- |
| Temperature, ° C | About 25 to 200° C | About 40 to 125° C. |
| Reaction time | Less than about 4 hrs | About 10 to 30 min. |
| Catalyst, based on phenol | Less than about 10 weight percent | About 0.1 to 1.0 weight percent. |
| Inert hydrocarbon diluent, based on total weight carbocyclic mixture and diluent. | Up to about 75 weight percent | About 20 to 35 weight percent. |
| Total carbocyclic mixture,[1] based on 100 parts by weight phenol. | About 10 to 80 parts by weight | About 40 to 60 parts by weight. |

[1] On a 100 weight percent basis when in a form substantially free of other materials.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol and suitable Friedel-Crafts acid catalysts are mixed, brought to the proper temperature and the carbocyclic compound mixture metered into the acidified (or catalyzed) phenol.

For purposes of this invention, the reaction of carbocyclic compound mixture with phenol is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted carbocyclic compound mixture using, for example, vapor phase chromatography.

The properties of a given so-substituted phenol product are affected by the process conditions used to make that product (e.g. molecular weight distribution, color and the like). The resulting reaction product is, as those skilled in the art will appreciate, a complex mixture of various different substituted phenols produced from the reaction of phenol under Friedel-Crafts conditions with the carbocyclic compound starting mixture to produce phenol molecules which are substituted both on ring carbon atoms and on phenol hydroxyl oxygen atoms by moieties derived from such carbocyclic compound.

A substituted carbocyclic compound phenol product can be prepared in a form substantially free of starting materials by conventional distillation separation techniques (e.g., steam distrillation, vacuum stripping, and the like), as those skilled in the art will appreciate, but in making resoles for use in this invention, such product can be used directly as made.

In general, to produce a resole for use in this invention, a substituted phenol product, as just described, is neutralized under aqueous liquid phase conditions as by the addition of base, and then from about 0.8 to 2.0 mols of formaldehyde per one mol of phenol (preferably from about 1.0 to 1.5 mols aldehyde per mol of phenol) is mixed with the substituted phenol product (now itself a starting material). Water may be added with the foraldehyde. Formalin is preferred as a source for formaldehyde.

Also, a basic catalyst material, such as hexamethylenetetramine, ammonium hydroxide, triethylamine, sodium, hydroxide, or mixtures thereof (or the like) is introduced into the reaction mixture. This basic catalyst can be used to neutralize the starting substituted phenol. Organic basic catalysts are preferred. The pH of this reaction mixture is maintained above 7.0 and preferably in the range from about 7.5 to 8.5. This reaction mixture is then heated to temperatures of from about 60 to 100° C. for a time sufficient to substantially react most of the formaldehyde and produce a desired resole product. Times of from about 20 to 140 minutes are typical. Aqueous liquid phase preparation conditions are generally but not necessarily used.

To optimize electrical properties in resoles used in this invention, it is preferred to use as a basic catalyst, when reacting such substituted phenols with formaldehyde to make resole resins, one which is organic in character.

The resole product produced by reacting the substituted phenol with formaldehyde as described above is one composed of methylolated substituted phenol which has been methylolated by the aldehyde to a desired methylol content and optionally advanced (e.g., the molecular weight of the methylolated substituted phenol increased) as by heating as necessary or desired to make a particular resole product. As those skilled in the art fully appreciate, the methylol content and the degree of advancement are controllable so that one can optimize such a resole resin for use in a particular application. For purposes of this invention, a phenol-formaldehyde resole resin or resole can be regarded as being the reaction product of the above-described substituted phenol mixture and formaldehyde under aqueous base catalyzed conditions as described herein which product can be thermoset by heat alone without the use of a curing catalyst.

In general, such a resole product as made is a brown colored, unstable, multiphase aqueous emulsion whose viscosity depends in any given instance, upon process and reactant variables but which usually ranges from a syrupy liquid to a semi-solid state. Such a resole product usually varies from a syrup to a solid. For use in the present invention, such a resole product is preferably prepared as a varnish.

To make or use a resin varnish for use in this invention, such an emulsion is dehydrated preferably under heat and reduced pressure to a water content of from about 0 to 15 weight percent. After such dehydration, the resulting resin is then dissolved in a relatively volatile, inert organic solvent medium which:

(1) is substantially inert,
(2) evaporates below about 150° C. at atmospheric pressures, and
(3) is a mutual solvent for said resole resin and water (if present).

While the organic liquid used has properties as indicated above, it will be appreciated that such liquid can comprise mixtures of different organic liquids. Preferred liquids are lower alkanols such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent.

Those skilled in the art will appreciate that care should preferably be taken when using this procedure to use an organic liquid system in which the phenolic resole resins are completely soluble as well as any water present. Adding, for example, a ketone or an ether-ester solvent like butyl Cellosolve will generally improve the water tolerance (ability to dissolve water) of a solvent system.

These varnishes are characteristically dark colored, one-phase, clear liquid solutions each having a viscosity ranging from about 50–5000 centipoises. The exact viscosity of a given varnish depends upon many chemical process and product variables. For impregnating applications, viscosities of from about 50 to 500 centipoises are preferred.

The total solids content of a given varnish can be as high as about 85 weight percent or even higher and as low as about 20 weight percent or even lower, but preferred solids contents usually fall in the range of from about 25 to 65 weight percent.

Such resole varnishes used in this invention thus comprise:

(A) from about 20 to 75 weight percent of a dissolved mixture of a phenol-formaldehyde resole resin,
(B) from about 0.5 to 5 weight percent of dissolved water,
(C) the balance up to 100 weight percent of any given varnish being an organic liquid having properties as described above.

The organo phosphates used in the phenolic resin solutions of this invention are characterized by the Formula 1 above.

Formula 1 compounds are generally known to the prior art and can be prepared by any convenient synthetic route, for example, one preferred and convenient route is to react phosphorous oxychloride ($POCl_3$) with an appropriate halophenol. Mixtures of different halophenols (optionally with phenol itself) can be employed.

To prepare a composition of this invention, one convenient procedure involves the admixing together of a solution of water soluble phenol-formaldehyde resole resin and a solution of a substituted phenol-formaldehyde resole resin as being prepared as above described. Any convenient mixing procedure can be used. In general, simple physical mixing procedures are sufficient and preferred for use in making such a mixture of these two different resole resins. It is then convenient to add to this product mixture at least one organo phosphate of the Formula 1. In general, these phosphates are soluble in the liquid of the mixture in the amounts employed so that no particular problem with dissolution of Formula 1 compound in such a liquid solution of resins is encountered when convenient preparation techniques can be employed to prepare the resin solutions of this invention. Preferred phenolic resin solutions of this invention contain from about 5 to 15 weight percent of the water soluble phenol-formaldehyde resole resin, from about 55 to 70 weight percent of the substituted phenol-formaldehyde substituted resole resin, from about 20 to 30 weight percent of the Formula 1 organo phosphate, and the balance up to 100 weight percent being an organic liquid as described above. It is desirable and preferred to so regulate the water content of the respective starting resole resins that the total water content (dissolved in organic liquid) in a product solution of the invention is under about 15 weight percent total.

As indicated above, the phenolic resin solutions of this invention are particularly well suited for use in the single pass impregnation of cellulosic substrates in laminate manufacture.

In general, an individual cellulosic substrate used in the present invention in a preformed sheet-like condition and need have no special characteristics. It can be composed of cellulosic fibers which optionally can contain up to about 50 weight percent of a synthetic organic polymeric fibrous material, such as a polyester, a polyimide, a vinylidene chloride polymer, and acrylonitrile/vinyl chloride copolymer, mixtures thereof, and the like. Typical thicknesses range from about 3 to 30 mils (under about 10 preferred). The cellulosic substrate, whether or not modified with such a polymeric fibrous material is preferably in an integral, uniform, woven or non-woven, sheet-like condition. Preferably, individual substrate members are composed of cellulose. The cellulosic fibers used in such a substrate member can be of natural or synthetic origin. Typical well known sources for cellulose fibers include wood, cotton, and the like. Typically, and preferably, average fibers used in substrates employed in this invention have length to width ratios of at least about 2:1, and more preferably about 6:1, with maximum length to width ratios being variable.

The term "substantially" as used herein in reference to cellulosic substrates has reference to the fact that such a substrate comprises mainly cellulose fibers with not more than about 5 to 10 percent of any given cellulosic substrate being other components, such as non-fibrous fillers, diluents, and the like, or fibrous non-cellulosic materials, such as those derived from organic sources (e.g.)

Particularly when high electrical properties are desired in a product laminate of the invention, the cellulosic substrate member should have a low ash content. Ash contents under 1 weight percent (based on total cellulosic substrate member weight percent are more preferred.

Preformed cellulosic substrates are preferred for using a phenolic resin solution of this invention in laminate manufacture.

In general, impregnation of a preformed substrate cellulosic member with a solution of this invention can be accomplished by any conventional means, including spraying, dipping, coating, or the like, after which it is convenient and preferred to dry the so-treated sheet to remove residual volatile components and thereby leave an impregnated sheet-like construction. In drying, care is used to prevent leaving excessive volatile material in the impregnated sheet. In general, a volatile level of less than about 6 percent by weight is desired.

For purposes of this invention, volatile level is conveniently determined by loss in weight after 10 minutes at 160° C. of a sample impregnated sheet. As indicated, a so-impregnated sheet member contains from about 50 to 70 weight percent of solids derived from said composition.

The product intermediate impregnated sheet member can be considered to be a novel product of this invention.

When such an impregnated intermediate sheet member is to be used in the manufacture of laminates, it is preferred to use such a sheet member which has been advanced to an extent such that it has a flow of from about 3 to 20 percent (preferably from about 5 to 15 percent). To so advance a sheet member to such a flow, it is convenient to heat in air such an intermediate sheet to temperatures in the range of from about 30 to 180° C. for a time sufficient to advance same to the so-desired extent. It will be appreciated that such an advancement can be conveniently accomplished while residual volatile materials are being removed in a drying operation after impregnation, as indicated above.

Intermediate sheet-like members of this invention, whether advanced to the extent indicated or not, are generally at least about 4 mils thick and can be as thick as 25 mils, though thicknesses not more than about 10 mils are preferred.

The density of an individual intermediate sheet-like member is relatively unimportant since the laminate, as described below, is formed under heat and pressure conditions which generally solidify all components together into an integral, solid, non-porous, thermoset mass.

To make a laminate construction of this invention, one forms: At least one sheet-like member (preferably advanced as described above) into a layered configuration which is at least two layers thick with adjoining layers being substantially in face-to-face engagement. As those skilled in the art will appreciate, an individual laminate construction of the invention can comprise a series of different impregnated cellulosic substrate members at least one of which is an intermediate sheet-like member of this invention or it can comprise a series of similar such intermediate members depending upon properties desired in the product laminate.

Such a layered configuration is then subjected to pressure in the range of from about 50 to 2000 p.s.i. while maintaining temperatures in the range of from about 120 to 180° C. for a time sufficient to substantially completely thermoset the composite and thereby produce a desired laminate. Preferably, the laminate is pressed at 140–160° C. at 500–1500 p.s.i. for 15–60 minutes. It is preferred to use sheet members of this invention as the sole components for laminates of this invention.

The product laminates of this invention find use in a variety of applications, for example, in printed circuit and terminal boards, structural parts, electrical switches, instrument panels, switch parts, and so forth. The intermediate sheet members are useful in making filters, battery separators, etc.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of substituted phenol-formaldehyde resole resins suitable for use in this invention are as follows: In these examples, the substituted phenol-formaldehyde resole resin used in each instance has an aldehyde to phenol ratio of from about 0.8 to 2.0, is produced by reacting under aqueous liquid phase conditions formaldehyde and an indicated substituted phenol mixture in the presence of an organic basic catalyst, is substantially insoluble in water but soluble in methanol to an extent that a 55 weight percent solution thereof can be prepared, and has a free formaldehyde content of less than about 5 weight percent. The substituted phenol mixture itself is prepared by reacting an indicated mixture of carbocyclic compounds with phenol at a temperature ranging from about 25 to 200° C. using from about 35 to 80 parts by weight of such carbocyclic compound mixture (excluding diluents) for each 100 parts by weight of phenol.

Example A 100 parts of phenol and 1 part of concentrated sulphuric acid as an acid catalyst are charged to a suitable reaction vessel and heated to 50° C. 70 parts of a carbocyclic compound mixture available commercially from the Monsanto Company under the trade designation "Resin Oil" and having a composition as given above in Table I is added to the starting mixture while keeping the temperature stable at 50° C. The temperature of the resulting mixture is held at 50° C. after addition of the carbocyclic compound mixture for 1 hour and then to this resulting mixture is added 7.5 cc. of 28 percent $NH_4OH$ to neutralize the acid catalyst. To this neutralized reaction mixture is added .2 parts of triethylamine and 60 parts of 50 percent formalin (50–60 formaldehyde-water). Now this reaction mixture is heated to a reflux at 100° C. and is refluxed thusly for 4 hours. Then the reaction mixture is cooled and volatile materials are removed under a vacuum of 28 inches of mercury until the temperature of the mixture rises to 80° C. Then 60 parts of methanol are added to the resin product to form a solution having solids content of 68.5 percent, a pH of 8.62, and a water content of 1.9 percent.

Examples C through N

The following examples are presented in tabular form for brevity. The process in all instances is as in Example A except that the indicated variables are altered as shown in Table III below in each respective instance.

In Table III, carbocyclic compound mixture A is Monsanto Resin Oil; B is Enjay's Heart Cut LPD; and C is Gulf Resin Former Feed Stock (see Table I). Also, in Table III, the numbers listed under "Type Catalyst" designate specific Friedel-Crafts catalysts as follows:

1—$H_2SO_4$
2—$BF_3$ diethyl ether

TABLE III

| Ex. No. | Phenol | Catalyst | Catalyst | Type carbocyclic compound mixture | Amount carbocyclic compound mixture | Reaction temperature, °C. | Post reaction time, minutes |
|---|---|---|---|---|---|---|---|
| C | 100 | 1 | 1.0 | A | 50 | 50 | 15 |
| D | 100 | 1 | 1.0 | A | 50 | 75 | 15 |
| E | 100 | 1 | 0.3 | A | 70 | 100 | 15 |
| F | 100 | 1 | 0.3 | A | 80 | 75 | 15 |
| G | 100 | 1 | 0.3 | B | 90 | 75 | 45 |
| H | 100 | 2 | 0.5 | B | 70 | 50 | 15 |
| I | 100 | 1 | 0.3 | A | 70 | 75 | 15 |
| J | 100 | 1 | 0.3 | C | 50 | 75 | 15 |
| K | 100 | 2 | 0.5 | C | 90 | 75 | 15 |
| L | 100 | 1 | 0.3 | C | 125 | 85 | 15 |
| M | 100 | 1 | 0.3 | C | 50 | 50 | 45 |
| N | 100 | 1 | 0.3 | C | 75 | 125 | 15 |
| O | | | | | | | |

Example O

To a suitable vessel is charged phenol (100 parts) and sulfuric acid (0.3 part). The carbocyclic mixture of Example A (70 parts) is metered into the starting mixture of stirred phenol plus acid at 70–80° C. After this addition, triethylamine (2 parts), hexamethylenetetramine (3 parts) and 50% formalin (60 parts) are added. After refluxing for 110 minutes, the mixture is dehydrated to 60° C. and 28″ Hg, methanol (75 parts) and acetone (8 parts) is added and stirred to solution. A 60 percent solids varnish is thus obtained.

Example P

Charge 100 parts of phenol and 1 part of $BF_3$ to a suitable reaction vessel and heat the mixture to 50° C. Add 70 parts of resin oil to the mixture over a period of 2 hours while keeping the temperature stable at 50° C. After addition of the resin oil, add 5.0 cc. of 28 percent $NH_4OH$ thereto to neutralize the acid catalyst. To the neutralized reaction mixture add 2 parts of triethylamine and 60 parts of 50 percent formalin (50–50 formaldehyde-water). Now heat the reaction mixture to a reflux at 90° C. and continue refluxing the mixture for 2 hours. Then cool the reaction mixture and remove volatile material under a vacuum of 27 inches of mercury until a temperature of 80° C. is reached. Then add 50 parts of methanol to the reaction mixture. A 70 percent solids varnish is thus obtained.

Examples of water soluble phenol-formaldehyde resole resins having a combined phenol-formaldehyde mol ratio of from about 1.0 to 2.5 suitable for use in this invention are as follows:

Example Q

Phenol (100 parts), 50 percent formalin (111 parts) and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

Example R

Phenol (100 parts), 50 percent formalin (80 parts), and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

Example S

Phenol (100 parts), 50 percent formalin (128 parts) and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin.

Examples of specific organo phosphate compounds of Formula 1 suitable for use in the phenolic resin solutions of this invention are as follows:

T. o-chlorophenyl diphenyl phosphate
U. tri(o-chlorophenyl) phosphate
V. 2,4-bromophenyl diphenyl phosphate
W. p-bromophenyl diphenyl phosphate
X. di(o-chlorophenyl) phenyl phosphate
Y. di(2,4-dichlorophenyl) phenyl phosphate The following examples illustrate phenolic resin solutions of this invention. In each instance, preparation is accomplished by mixing together the indicated quantities of components selected from the foregoing Examples A–Y. Results are summarized in Table IV below.

TABLE IV

| Ex. No. | Substituted phenolic resin | | Water soluble phenolic resin | | Formula 1 compound | |
|---|---|---|---|---|---|---|
| | Type | Amount | Type | Amount | Type | Amount |
| 1 | A | 100 | Q | 15 | X | 25 |
| 2 | B | 100 | S | 20 | V | 20 |
| 3 | E | 100 | Q | 20 | T | 24 |
| 4 | G | 100 | R | 10 | Y | 15 |
| 5 | I | 100 | S | 20 | V | 20 |
| 6 | J | 100 | S | 20 | T | 20 |
| 7 | K | 100 | S | 20 | X | 20 |
| 8 | M | 100 | R | 20 | W | 25 |
| 9 | N | 100 | R | 20 | X | 25 |
| 10 | O | 100 | Q | 15 | T | 25 |
| 11 | O | 100 | Q | 20 | T | 25 |
| 12 | O | 100 | Q | 25 | T | 25 |
| 13 | O | 100 | R | 20 | U | 20 |
| 14 | O | 100 | S | 20 | Z | 25 |
| 15 | P | 100 | Q | 20 | T | 25 |

Examples of intermediate sheet-like members made using the phenolic resin solutions of this invention are prepared as follows:

Examples 16–25

Samples of preferred cellulosic substrate types are chosen as follows:

Type 1: Non-woven cotton linters paper, about 10 mils in thickness

Type 2: Non-woven unbleached kraft paper about 7 mils in thickness.

Type 3: Non-woven α-cellulose paper about 10 mils in thickness

Type 4: Non-woven bleached kraft paper about 15 mils in thickness.

All types have an ash content less than about 0.9 weight percent.

The impregnation procedure for impregnating each above substrate is as follows:

Preformed cellulosic sheets are passed through the impregnating solution (Example II), drawn through the nip region between a pair of squeeze rolls to remove excess resin and hung in an oven at 135° C. for drying to a volatile content of less than 6 percent. Volatile content is the loss of weight of the dried impregnated sheet after exposure to 160° C. for 10 minutes. A resin content of about 60 percent and a flow of about 5 percent is thus obtained in each sample sheet so treated. Examples are illustrated in Table V below.

For purposes of this invention, flow of green resin sheet is determined by the following procedure.

From an impreynated sample sheet, six 2″ diameter discs are cut and assembled together in deck fashion in face-to-face engagement. Then, to opposed faces of the resulting deck there is applied about 1000 p.s.i. pressure using 150° C. for 5 minutes. Thereafter, the discs are cooled and any resin which has exuded from the discs is removed by abrasion, scraping, or the like. The difference in weight between the green sandwich and the pressed sandwich is flow.

The volatile content of each such sheet is less than 6 percent. The results are summarized in Table V below.

TABLE V

| | Preformed sheet type | Resin solution | Flow, percent |
|---|---|---|---|
| Example No.: | | | |
| 16 | 1 | 3 | 4 |
| 17 | 2 | 3 | 6 |
| 18 | 3 | 3 | 5 |
| 19 | 4 | 3 | 5 |
| 20 | 1 | 5 | 6 |
| 21 | 1 | 6 | 7 |
| 22 | 1 | 8 | 4 |
| 23 | 1 | 11 | 5 |
| 24 | 1 | 13 | 5 |
| 25 | 1 | 14 | 6 |

Examples of laminates made using the phenolic resin solutions of this invention are prepared as follows:

Examples 26–35

Using the intermediate sheet-like members prepared above in Examples 26–35 laminates are prepared.

The lamination procedure involves the steps of first assembling a prechosen plurality of intermediate sheet-like members into a deck or sandwich and then applying to the opposed exposed faces of the resulting deck, appropriate heat and pressure for a time sufficient to substantially completely cure the impregnated resins and produce the desired laminates. These laminates have excellent punchability and electrical characteristics. The details are summarized in Table VI below:

TABLE VI

| Impregnated cellulosic sheet members as described in example number | No. of layers used | Laminate forming conditions | | |
|---|---|---|---|---|
| | | Pressure, p.s.i. | Temp., ° C. | Time, min. |
| Example No.: | | | | |
| 26 | 16 | 7 | 1,000 | 160 | 30 |
| 27 | 16 | 8 | 1,000 | 165 | 30 |
| 28 | 17 | 7 | 1,000 | 150 | 30 |
| 29 | 18 | 7 | 1,300 | 145 | 45 |
| 30 | 19 | 7 | 1,000 | 150 | 60 |
| 31 | 20 | 8 | 1,000 | 150 | 30 |
| 32 | 21 | 8 | 1,000 | 150 | 30 |
| 33 | 22 | 8 | 1,000 | 150 | 30 |
| 34 | 23 | 8 | 1,300 | 160 | 30 |
| 35 | 24 | 8 | 1,300 | 160 | 30 |

In general, to thermoset (cure) an intermediate cellulose substrate impregnated with resin in accordance with the teachings of this invention, one conveniently heats the so-impregnated structure to a temperature ranging from about 200 to 350° F. for a time of from about 1 to 45 minutes, though lower and higher times and temperatures can be used.

What is claimed is:

1. A liquid composition adapted for use in the single-pass impregnation of cellulosic substrates comprising:
 (A) from about 5 to 20 weight percent of water-soluble phenol-formaldehyde resole resin having a phenol to formaldehyde mol ratio of from about 1.0 to 2.5,
 (B) from about 50 to 75 weight percent of a substituted phenol-formaldehyde resole resin,
 (C) from about 15 to 35 weight percent of at least one organo phosphate of the formula:

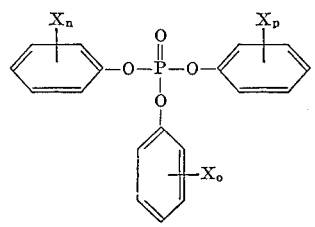

where, each individual X is selected from the group consisting of fluorine, chlorine, bromine, and iodine, and $n$, $o$, and $p$ are each an integer of from 0 through 5 inclusive, and at least one of $n$, $o$, and $p$ in any given molecule is an integer greater than 0, and
 (D) the balance up to 100 weight percent of any given solution being substantially an organic liquid which:
  (1) is substantially inert,
  (2) evaporates below about 150° C. at atmospheric pressures,
  (3) is a mutual solvent for said resins and said organo phosphate
 (E) said substituted phenol-formaldehyde resole resin being characterized by:
  (1) having a formaldeyde to phenol mol ratio of from about 0.8 to 2.0,
  (2) being produced by reacting under aqueous liquid conditions formaldehyde and a substituted phenol mixture in the presence of a basic catalyst,
  (3) being substantially insoluble in water but having a viscosity in methanol solution at 60 weight percent solids concentration of not greater than about 50 centipoises, and
  (4) having a free formaldehyde content which is less than about 5 weight percent,
 (F) said substituted phenol mixture having been prepared by reacting phenol under Friedel-Crafts conditions with from about 35 to 80 parts by weight for each 100 parts by weight of said phenol of a mixture of carbocyclic compounds,
 (G) said mixture of carbocyclic compounds comprising (on a 100 weight percent basis when in a form substantially free of other materials):
  (1) from about 10 through 40 weight percent (total mixture basis) of compounds each molecule of which has:
   (a) the indene nucleus,
   (b) from 9 through 13 carbon atoms,
   (c) as nuclear substituents from 0 through 4, methyl groups,
  (2) from about 5 through 70 weight percent (total mixture basis) of compounds, each molecule of which has:
   (a) the dicyclopentadiene nucleus,
   (b) from 10 through 13 carbon atoms,
   (c) as nuclear substituents from 0 through 3 methyl groups,
  (3) from about 15 through 65 weight percent (total mixture basis) of compounds, each molecule of which has:
   (a) a phenyl group substituted by a vinylidene group,
   (b) from 8 through 13 carbon atoms,
   (c) as substituents from 0 through 3 groups selected from the class consisting of methyl and ethyl, (4) from about 0 through 5 weight percent divinyl benzene, (5) provided that the sum total of all such compounds in any gives such mixture of carbocyclic compounds is always 100 weight percent.

2. An intermediate sheet-like member adapted for use in the manufacture of punchable laminates comprising:
  (A) a substrate member in sheet form comprising at least 50 weight percent cellulosic fibers with the balance up to 100 weight percent of any given such member being a synthetic organic polymer fibrous material,
  (B) said substrate member being impregnated with a composition of claim 1 so that said substrate contains from about 50 to 70 weight percent of total solids (dry total sheet-like member weight basis) derived from a composition of claim 1.

3. A sheet-like member of claim 2 which has been heated to temperatures in the range of from about 30 to 80° C. for a time sufficient to advance resin solids impregnated into said sheet member to an extent such that sheet-like member has a flow of from about 3 to 20 percent.

4. A laminate having relatively low water absorption characteristics, fire retardancy characteristics, relatively low crack free punch temperature characteristics, relatively low dielectric constants and relatively low dissipation factors, prepared by the steps of:
  (A) providing at least one sheet-like member of claim 3 and assembling into a layered configuration at least two layers thick with adjoining layers being substantially in face-to-face engagement, and
  (B) subjecting the so-resulting layered configuration to pressures in the range of from about 50 to 2000 p.s.i. while maintaining temperatures in the range of from about 120 to 180° C. for a time sufficient to substantially completely thermoset both said first composition and said second composition and thereby produce a desired laminate.

5. A sheet-like member of claim 2 which has been subjected to elevated temperatures for a time sufficient to substantially completely thermoset resin solids therein.

References Cited

UNITED STATES PATENTS

| | | | |
|---|---|---|---|
| 2,237,634 | 4/1941 | Rosen | 260—838 |
| 2,351,716 | 6/1944 | Smith | 260—838 |
| 2,593,936 | 4/1952 | Simons | 260—838 |
| 2,979,484 | 4/1961 | Redfarn | 260—51 |
| 3,058,941 | 10/1962 | Birum | 260—30.6 |
| 3,377,317 | 4/1968 | Hoxie | 260—30.6 |

JOHN T. GOOLKASIAN, Primary Examiner

D. J. FRITSCH, Assistant Examiner

U.S. Cl. X.R.

117—136, 155, 161; 156—335; 161—258, 259, 263, 264, 403; 260—30.6, 45.7, 838